April 10, 1962  G. J. BATORI  3,028,901
TRACTION DEVICE FOR VEHICLES
Filed Nov. 18, 1959  2 Sheets-Sheet 1

INVENTOR:
George Batori
BY

April 10, 1962 G. J. BATORI 3,028,901
TRACTION DEVICE FOR VEHICLES
Filed Nov. 18, 1959 2 Sheets-Sheet 2

INVENTOR:
George Batori
BY

Patented Apr. 10, 1962

3,028,901
TRACTION DEVICE FOR VEHICLES
George J. Batori, 62 Oakwood Ave., Hamburg, N.Y.
Filed Nov. 18, 1959, Ser. No. 853,851
1 Claim. (Cl. 152—239)

This invention relates to a traction grip device for motor vehicle tires, which device, when applied to the wheel, prevents it from skidding or slipping on snow or mud.

At present only different types of chains are in use and not a single chainless traction device has been successful. The tire chain, as it is known, is a nuisance to apply and remove. Furthermore, it is heavy, averse to both pavement and tire, and not durable.

The invention overcomes all these difficulties while its weight is only one-third of a tire chain.

The essence of the invention is that the parts of the device that come in contact with the pavement are much wider than the width of the tire. Furthermore, the parts are made out of rubber or of a synthetic substance which has such qualities that it can withstand wear, temperature change and is resilient. This kind of a traction element, unmounted, resembles a trapezoid that is open at the top. The anti skid part of the device constitutes the base of an isosceles trapezoid, while the sides of the trapezoid are only resilient to the extent that when the car is in a standing position, the device can be applied quickly in such a manner that the element stays in position when and where it is installed. The elements are situated transversely over the periphery of the tire and the elements are connected by a steel cable ring around the sides of the tire. The sides of the traction elements are not in contact with the wheel rim and their position in motion is assured by the steel cable ring, not by their resiliency, which only serves the purpose of quick and easy installation. This property of the device is assured by the resiliency of the sides of the elements and by the more rigid than chain, steel cable ring. Furthermore, the extremely durable material comprising these elements provides no adverse effects on either the pavement or the tire.

An important factor of the invention is the shape of the elements. As it will be seen, the elements retain their shape even while the car is in motion and its weight goes through the element without the element hindering the resilient function of the tire.

Figure 4:
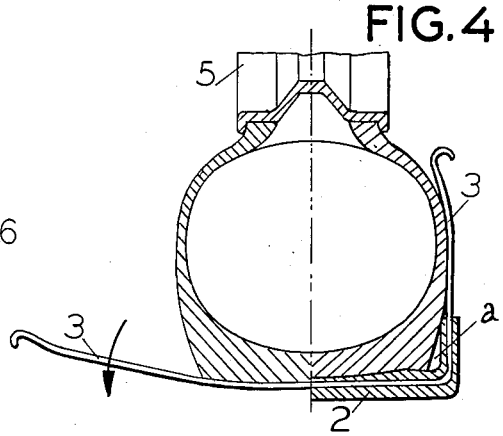

FIGURE 4 also is a cross sectioned view, but the right side "B" shows the tire weighted by the car, while the left side "A" shows the effect that would result if the shape of the elements would make them have total contact with the tire.

Figure 5:
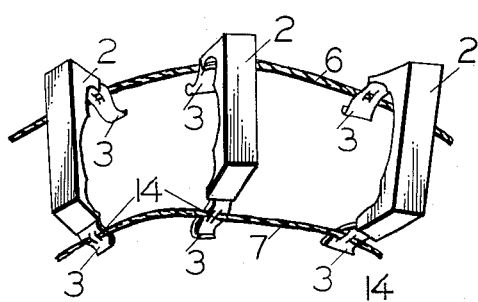

FIGURE 5 shows, in perspective, the coupling of the elements without tire.

Figure 6:
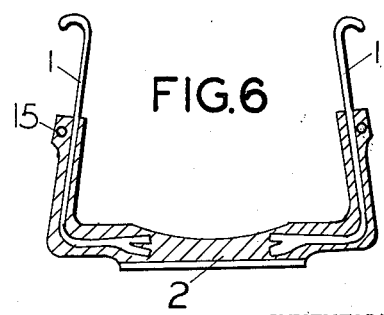

FIGURE 6 is a cross section of the first figure.

Figure 7:
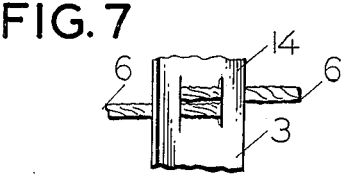
Figure 8:
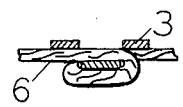
Figure 9:
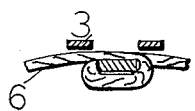
Figure 11:
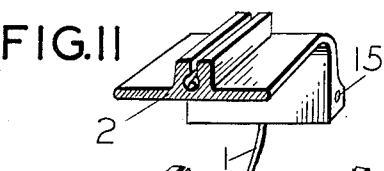
Figure 12:
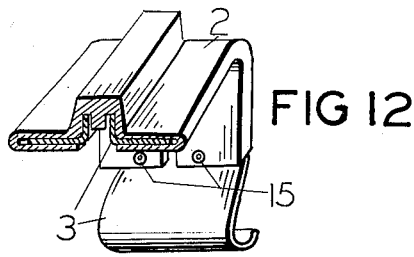
Figure 13:
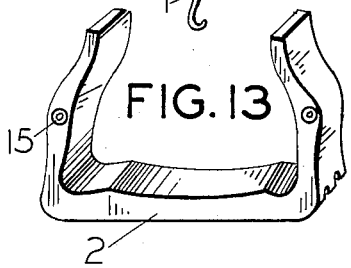

FIGURES 7, 8 and 9 show the fastener clip. FIGURE 7 is a perspective view, while FIGURES 8 and 9 show a cross section of how the steel cable is to be fixed. The FIGURE 8 shows the position after the lacing and FIGURE 9 shows the shut position, when the steel cable is fastened.

FIGURES 10, 11, 12 and 13 show the anti skid elements in various perspective views.

Figure 14:
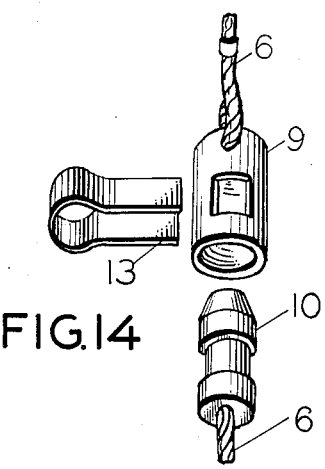

FIGURE 14 shows an automatic cable fastener in perspective view.

Figure 15:
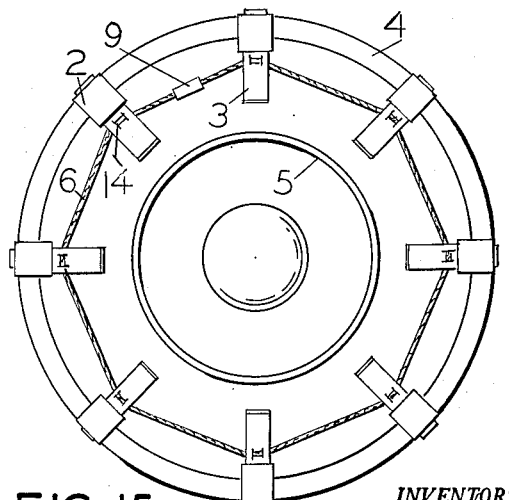

FIGURE 15 shows the complete installed anti skid device in front view.

Figure 1:
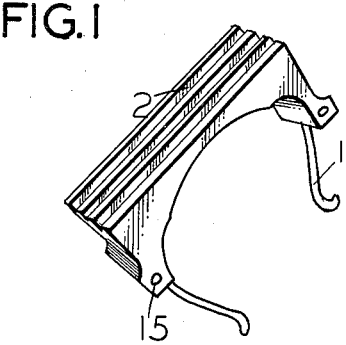
FIGURES 1 and 2 are a perspective view of the element.
Figure 2:
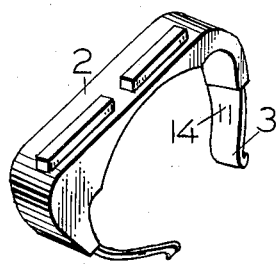

Referring to the drawings in detail: On all the figures 2 is the anti skid element, a part of them made out of rubber or some other synthetic matter, as polyurethane while 1 is the resilient part made out of wire and 3 out of steel strips. These resilient parts 1 and 3 can be made in one or two pieces, as shown on FIGURES 3 and 6 or out of rubber or some synthetic matter without steel as shown on FIGURE 13.

Figure 3:
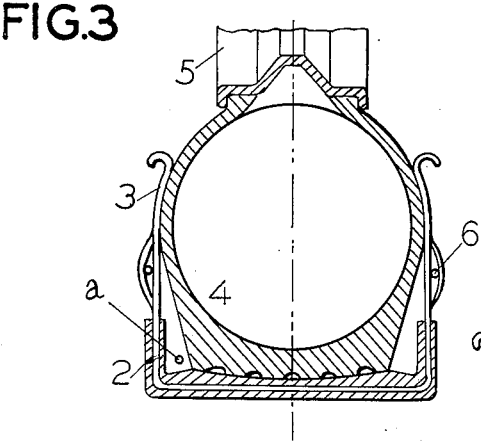
FIGURE 3 is a radial sectioned view of the element mounted on an unweighted tire.

On FIGURES 3 and 4 the tire is 4, the wheel rims 5.

Through testing and experimenting I have arrived at the conclusion that the anti skid element cannot touch the tire everywhere because the sides at the moment of loading, when the weight of the car goes through the non skid element are bent so that within a short time they lose their resiliency. The tire changes its shape at every revolution according to the load and the type of pavement. That is why the important part of the invention is that the non skid element part which comes in contact with the ground is straight and on both sides it has adequate space, FIGURE 3, part a, which makes it possible for the tire to change its shape without going beyond the resilient capacity of the anti skid element. This can be seen on FIGURE 3. Space a is not detrimental. On the contrary, it is very advantageous for traction because the non skid element has a wider area contact with the ground and this area at the point of contact is almost fully weighted, depending on the load.

FIGURE 4 on the right "B" side of the symmetry line shows that moment at which according to the invention, the non skid element is under load, while the left "A" side shows how the non skid element would be bent out of shape if it would be made without the space a.

Figure 10:
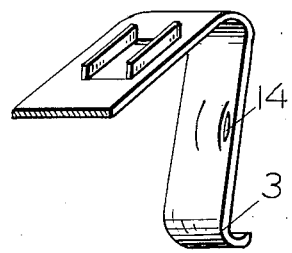

FIGURE 10 is a view of half of the element whose side which holds the anti skid device, made out of rubber or some other synthetic matter, will not rip away from it. On FIGURES 11 and 12 the rubber or synthetic matter is not molded to the resilient strip, but it is made in such a way that if after long use it should wear away, it can be replaced by anyone at home. The rubber or some other synthetic device is cut at the top, FIGURE 11, at the bottom, FIGURE 12, so that it can be installed on the steel strips or on wire.

Another important part of the invention is that the resilient part of the element does not come into contact with the tire rim 5, FIGURE 3, so that it does not hinder the normal working of the tire and it does not damage the rim. The non skid elements as seen on FIGURE 5 are clipped together by the 6, 7 steel cable rings on both sides of the tire. The steel cable rings insure the position of the non skid elements. Therefore, it is important that it be not attached to the end of the resilient strips, but close to the running area as shown on FIGURES 15, 14.

The steel cable rings are connected with the elements by fasteners, 14, made out of resilient matter on FIGURES 2 and 5, or fastened with bushings 15 on FIGURES 1, 6, 11, 12 and 13.

For the easy and quick connection of the steel cable rings the automatic connector is shown in FIG. 14. The spring 13 is always on a casing 9 to which an end of steel cable ring 6 is attached. The other end of the steel cable ring is attached to the cubed piece 10. If we press the cubed piece into the casing, the cubed piece will press the spring outward and the smaller diameter part of the cube 10 will slip into place thereby parts 9, 10 will be firmly connected. By pressing the spring outward, the steel cable ring can again be opened.

The installation of the device is simple. In case of the traction wheel being covered on the side by a fender, it is installed automatically. That is, you only have to place the first element on the tire close to the ground and let the rest of the elements stand behind the wheel on the ground and slowly drive ahead until the wheel has gone through a complete rotation. The elements stay in place on the tire. In this way the only thing that has to be done to secure the device is to clip the cable rings together. In this case it is better if the first element is more resilient than the rest. But if the traction wheel is uncovered, it is better that all of them have the same resiliency so that they stay where they were pressed onto the tire.

What is claimed:

An anti-skid device for vehicle tires comprising several resilient isosceles trapezoid-shaped traction cross-members to be applied to a periphery of the tire, the equal two side-members of the isosceles trapezoid extending radially inwardly of the tire, when so applied, and having a ground engaging base, said two side-members of the isosceles trapezoid each touching the tire at only one point and allowing the tire to spread when under load without spreading the side-members, said side-members of the isosceles trapezoid being connected on both sides of the vehicle tire with a common split locking side-member ring, preventing the isosceles trapezoid-shaped traction members from flying off because of the centrifugal force.

References Cited in the file of this patent
UNITED STATES PATENTS

| | | |
|---|---|---|
| 1,571,764 | Edwards | Feb. 2, 1926 |
| 1,858,412 | Neumann | May 17, 1932 |
| 2,252,027 | Pasquarella | Aug. 12, 1941 |
| 2,330,839 | O'Brien | Oct. 5, 1943 |
| 2,424,478 | Mason | July 22, 1947 |
| 2,438,656 | Crumrine | Mar. 30, 1948 |
| 2,458,642 | Reynolds | Jan. 11, 1949 |
| 2,722,260 | Renwick | Nov. 1, 1955 |